(12) United States Patent
Kozycki (10) Patent No.: US 6,406,366 B1
(45) Date of Patent: Jun. 18, 2002

(54) METHOD AND APPARATUS FOR REMOVING PIN BONES

(75) Inventor: Lawrence V. Kozycki, Fairbanks, AK (US)

(73) Assignee: University of Alaska Fairbanks, Fairbanks, AL (US)

( * ) Notice: Subject to any disclaimer, the term of this patent is extended or adjusted under 35 U.S.C. 154(b) by 0 days.

(21) Appl. No.: 09/625,799

(22) Filed: Jul. 26, 2000

Related U.S. Application Data (63) Continuation-in-part of application No. 09/253,262, filed on Feb. 19, 1999, now Pat. No. 6,123,614
(60) Provisional application No. 60/190,820, filed on Mar. 21, 2000, and provisional application No. 60/075,316, filed on Feb. 20, 1998.

(51) Int. Cl.[7] ........................... A22C 17/02; A22C 17/04
(52) U.S. Cl. ............................. 452/135; 452/82; 452/83
(58) Field of Search ............................. 452/135, 83, 82

(56) References Cited

U.S. PATENT DOCUMENTS

| | | | |
|---|---|---|---|
| 3,529,318 A | * 9/1970 | Jobmann | 452/127 |
| 3,733,997 A | * 5/1973 | Beasley | 452/127 |
| 3,902,222 A | 9/1975 | Hartmann | |
| 4,037,294 A | 7/1977 | Cowie et al. | |
| 4,236,275 A | 12/1980 | Westerdahl | |
| 4,771,511 A | 9/1988 | Weyand | |
| 4,945,607 A | 8/1990 | Akesson et al. | |
| 5,088,958 A | 2/1992 | Evers et al. | 452/162 |
| 5,196,021 A | * 3/1993 | Kabla | 452/83 |
| 5,197,969 A | * 3/1993 | Visscher et al. | 452/82 |
| 5,207,689 A | * 5/1993 | Demeester | 452/84 |
| 5,520,576 A | 5/1996 | Wastell et al. | 452/161 |
| 5,525,101 A | 6/1996 | Soderlind | 452/135 |
| 5,830,052 A | 11/1998 | Wadsworth | 452/161 |
| 6,123,614 A | * 9/2000 | Kozychi | 452/135 |

FOREIGN PATENT DOCUMENTS

| | | | |
|---|---|---|---|
| DE | 26 41427 A | 5/1977 | 28/18 |
| JP | 06 046743 | 2/1994 | 25/16 |
| WO | WO 9212641 A | 8/1992 | 25/16 |
| WO | WO 9718717 A | 5/1997 | 25/16 |

* cited by examiner

*Primary Examiner*—Peter M. Poon
*Assistant Examiner*—Willis Little
(74) *Attorney, Agent, or Firm*—Needle & Rosenberg, P.C.

(57) ABSTRACT

An apparatus and method for removing a pin bone or pin bones from a fillet of fish. The apparatus of the present invention uses a rotating stack of individual disks that are engaged by a shaft, oscillate axially and are timed to alternately tilt in a rapid fashion so as to effect the action of multiple pairs of tweezers. The pin bone is disposed between a pair of tweezer or two adjacent rotating disks and pulled out of the fillet by the rotating disks. The rotating stack of individual disks operates at different speeds in an operation circle to enhance the operational efficiency.

39 Claims, 4 Drawing Sheets

METHOD AND APPARATUS FOR REMOVING PIN BONES

CROSS-REFERENCE TO RELATED APPLICATION

This application claims priority to U.S. Provisional Application Serial No. 60/190,820, entitled "Apparatus and Method for Removing Pin Bones," which was filed on Mar. 21, 2000, and is a continuation-in-part of application Ser. No. 09/253,262, entitled "Method and Apparatus for Removing Pin Bones," filed Feb. 19, 1999, U.S. Pat. No. 6,123,614, which itself claims priority to U.S. Provisional Application Serial No. 60/075,316, filed Feb. 20, 1998.

BACKGROUND OF THE INVENTION

1. Field of the Invention

The present invention relates to an apparatus and method for removing bones from a fish and, more specifically, for removing pin bones from a fillet of salmon, pollack, mackerel, trout, whitefish, haddock, scrod, and the like.

2. Background Art

Fish possess a skeletal structure that has a vertebral column, or back bone, from which spines extend upwardly (dorsal spines) and downwardly (ventral spines). No ventral spines are located in the region of the fish's belly cavity, however. Vertebrae extend over the top of the belly cavity for a short distance on either side of the mid-line, from which rib bones depend and curve downwardly to enclose the belly. Pin bones extend horizontally from the rib bones and terminate at or near the skin. There are about forty pin bones in salmon.

The normal method of filleting fish, by hand or machine, is to cut through the fish following the line of the bones from the dorsal to ventral fins and to pass over the rib bones, which severs the connections between the pin bones and the rib bones. Thus, a line of pin bones remains in the fillet.

There are two methods commonly used to remove the remaining pin bones from the fillet: cutting out the pin bones or pulling them out. For the first option, filleting machines exist in the prior art that can produce bone-free fish fillets, but the yield is substantially lowered since the whole belly flap is cut off to ensure complete removal of the pin bones. The flesh of the belly flap can be recovered in a minced form after its passage through a bone separating device.

However, since salmon and other fish are expensive, removal of the pin bones without extracting substantial quantities of meat is desired. Thus, the second option of pin bone removal is used, which is to pull the bones out of the fillet. The oldest technique is pulling out the bones using a gripping tool, such as pliers. However, this option is time-consuming and labor-intensive, which results in higher cost to the consumer and potential injuries to the workers, such as carpal tunnel syndrome.

Therefore, a need exists in the art for a relatively inexpensive device to remove pin bones from fish. It is desired that the device can be used in an automated process, instead of having an operator who removes the bones by manually maneuvering a machine. Still another need in the art is for a device that reliably extracts the pin bones without removing a significant amount of meat from the fillet, creating an unattractive surface appearance, or otherwise damaging the fillet.

New apparatus and method have been developed to meet these and other needs in the art. U.S. patent application Ser. No. 09/253,262, which is incorporated herein in its entirety by reference, in one aspect discloses an apparatus and method utilizing a plurality of substantially identical, spring-tempered sheet metal disks that each has a periphery that can be linear or non-linear to removing pin bones. The disks are assembled on a splined shaft to form a stack of the disks aligned so that the peripheries form an alternating pattern of "pinch-points," in which the periphery of two disks contact each other, and gaps, in which the peripheries are separated from each other.

SUMMARY OF THE INVENTION

The present invention relates to removing pin bones from a fillet of salmon, pollack, mackerel, trout, whitefish, haddock, scrod, and the like. The present invention, in one aspect, relates to an apparatus and method for removing a pin bone or pin bones from a fillet or like which use a rotating assembly or stack of individual disks that are engaged by a shaft, oscillate axially and are timed to alternately tilt in a rapid fashion so as to effect the action of multiple pairs of tweezers. The pin bone is disposed between a pair of tweezer or two adjacent rotating disks and pulled out of the fillet by the rotating disks. The rotating stack of individual disks operates at different speeds in an operation circle to enhance the operational efficiency. Various types of disks, such as disks disclosed in U.S. patent application Ser. No. 09/253,262 and disks existing in the prior art, can be utilized in the present invention.

Accordingly, in one aspect the present invention provides a pin bone removal apparatus comprising a frame having a first end and an opposed second end defining an axis therebetween, a plurality of disks, each disk having a center, a periphery circumscribing the center to form an opening, a diameter, a first side, and an opposed second side, and a shaft positioned between the first end and the second end of the frame and rotatable around the axis of the frame. The shaft has a circumference of a size to be complementarily received by and disposed through the opening in each disk to form a stack of the disks having a longitudinal axis substantially parallel to the axis of the frame. The apparatus further includes a first movable arm and a second movable arm positioned apart from the first movable arm thereby to define a space therebetween for receiving the stack of the disks therein. The first and second movable arms can move synchronously along the axis of the frame to cause the stack of the disks to move along with them to process a fillet or fillets.

In another aspect, the present invention provides a pin bone removal apparatus comprising a frame having a first end and an opposed second end defining an axis therebetween, a plurality of disks, each disk having a center, a periphery circumscribing the center to form an opening, a diameter, a first side, and an opposed second side, and a shaft positioned between the first end and the second end of the frame and rotatable around the axis of the frame. The shaft has a circumference of a size to be complementarily received by and disposed through the opening in each disk to form a stack of the disks having a longitudinal axis substantially parallel to the axis of the frame. The apparatus further includes at least one endless belt for transferring a fillet, wherein the endless belt has a top surface and a lower surface opposite the top surface. A floating feed roller is positioned above the top surface of the endless belt, and a nose roller is positioned beneath the top surface of the endless belt, thereby defining a space between the floating feed roller and the nose roller to allow the fillet to pass therethrough to the stack of the disks to be processed.

In yet another aspect, the present invention provides a pin bone removal apparatus comprising means for positioning the fillet over a stack of a plurality of disks at a first position, each disk having a center and a periphery that circumscribes the center to form an opening, the stack of the disks having a longitudinal axis extending through the centers of the disks, and means for moving the stack of the disks in a first direction longitudinally at a first speed and the fillet relative to each other so that the pin bone is disposed intermediate the periphery of two adjacent disks in the stack and removed thereby as the pin bone engages a portion of the periphery of each of the two adjacent disks, and moving the stack of the disks at a second speed in a second direction opposite the first direction substantially back toward the first position, wherein the second speed and the first speed are different.

In a further aspect, the present invention provides a method of removing a pin bone from a fillet comprising the steps of positioning the fillet over a stack of a plurality of disks at a first position, each disk having a center and a periphery that circumscribes the center, the stack of the disks having a longitudinal axis extending through the centers of the disks, moving the stack of the disks in a first direction longitudinally at a first speed and the fillet relative to each other so that the pin bone is disposed intermediate the periphery of two adjacent disks in the stack and removed thereby as the pin bone engages a portion of the periphery of each of the two adjacent disks, and returning the stack of the disks at a second speed toward the first position, wherein the second speed and the first speed are different.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a," "an," and "the" can mean one or more, depending upon the context in which it is used. The preferred embodiment is now described with reference to the figures, in which like numbers indicate like parts throughout the figures.

To start the process, a fish is gutted and decapitated. A machine or operator then longitudinally cuts as close to the dorsal spines as is practical, without cutting into the bones, to leave the maximum quantity of meat on a fillet F. However, the longitudinal cut also severs the pin bones from the rib bones so that the pin bones remain within the fillet F.

Referring generally to FIGS. 1–7, the present invention relates to a method and apparatus for removing a pin bone or pin bones (not shown) that remain in the fillet F. The present invention uses a plurality of disks aligned and positioned relative to each other, in which relative movement exists between the fillet F and the disks. The disks engage and hold the pin bone and the relative motion therebetween causes the pin bone to be plucked out of the fillet F.

Referring now to FIGS. 1–4, each disk 20 has a center 22, a periphery 24 circumscribing the center 22 to form an opening therein, a first side 26, and an opposed second side 28. The disks 20 are preferably formed of spring-tempered sheet metal that is corrosion resistant, but can be formed from any suitable material including plastics and metals. The disks 20 are substantially circular in plan view, i.e., a view of the first side 26 or the second side 28 from directly above or below when the disk 20 is horizontally disposed. The disks 20 also have a diameter extending from opposed portions of the periphery 24 through the center 22 of the disk 20. The diameter of the disks 20 can be varied according to the needs; in one embodiment, the diameter is between 2 and 10 inches. If the shape of the disk 20 is not circular in plan view (e.g., elliptical), then the diameter would be the "effective" diameter, which is calculated using the area of the cross section. That is, $$D = 4 \times (A/\pi)^{0.5} = 2.26 \times (A)^{0.5},$$

in which D is the effective diameter, A is the cross-sectional area, and $\pi$ is the constant pi.

Figure 1:
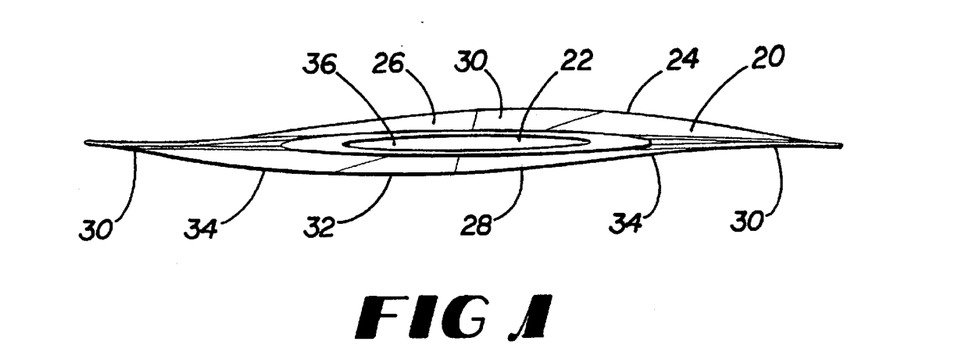
FIG. 1 is a side view of one disk used in the present invention.

The first side 26 and the second side 28 of each of disks 20 can be non-planar or substantially planar. FIG. 1 shows a non-planar disk 20 used in one embodiment of the present invention. More specifically, the periphery 24 of each disk 20 is non-linear to form a wavy pattern when the first and second sides 26, 28 are horizontally disposed. In contrast, a compact disk is substantially planar and has a linear periphery. The disks 20 are usually pressed to assume the wave form in their respective peripheries 24.

Still referring to FIG. 1, the periphery 24 of the disk 20 forms a plurality of upwardly positioned sections 30, a plurality of downwardly positioned sections 32, and a plurality of connecting sections 34 in the periphery 24 that connect the upwardly and downwardly positioned sections 30, 32. The upwardly and downwardly positioned sections 30, 32 sequentially alternate around the periphery 24 of the disk 20. The upwardly positioned sections 30 of the periphery 24 are substantially coplanar with each other and the downwardly positioned sections 32 are also substantially coplanar with each other. Accordingly, the connecting sections 34 are disposed at a non-parallel angle relative to the upwardly and downwardly positioned sections 30, 32. Thus, when disposed on a horizontal surface as shown in FIG. 1, the disk 20 rests on three equally-spaced portions of its periphery 24, which are the downwardly positioned sections 32, and three opposite and equally-spaced portions extend upwardly, which are the upwardly positioned sections 30.

As one skilled in the art will appreciate, other patterns of wavy peripheries 24 can be used, such as a sinusoidal pattern, a squared step pattern, and the like.

Figure 2:
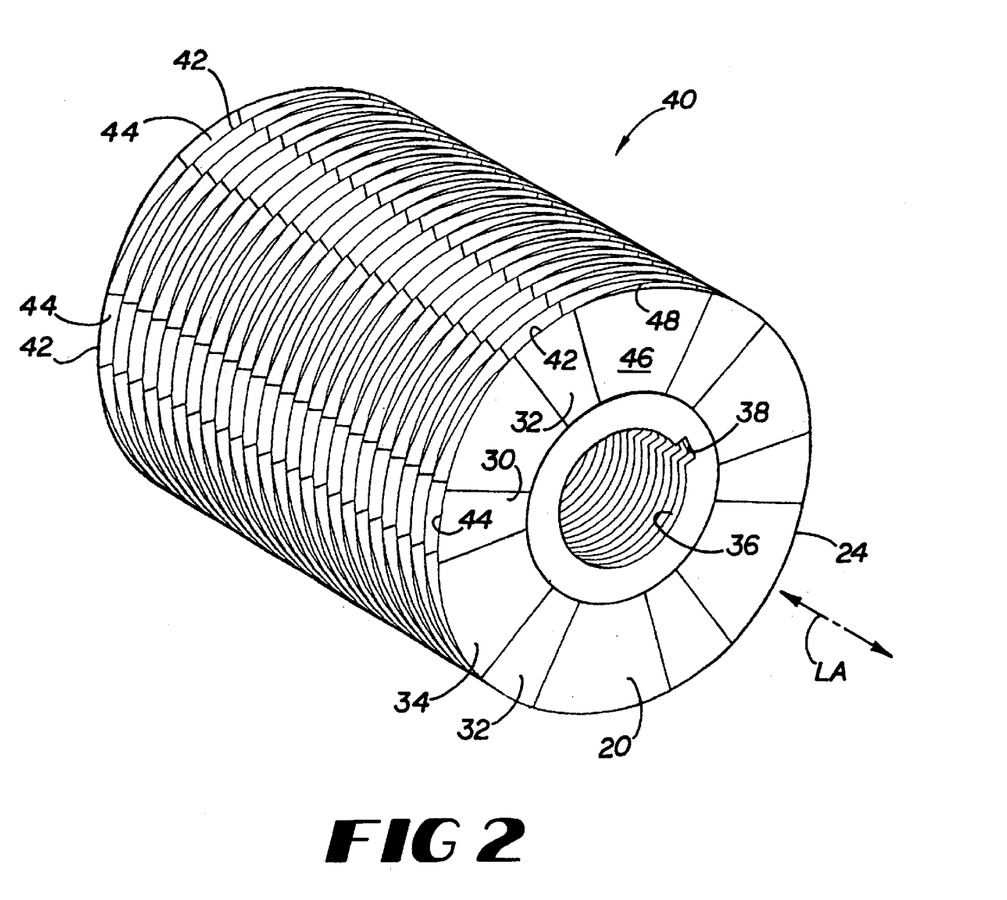
FIG. 2 is a front perspective view of the first embodiment of a stack of the disks, one of which is shown in FIG. 1, in which gaps and pinch-points are formed between the peripheries of adjacent disks in the stack.

Referring now to FIG. 2, a plurality of the non-planar disks 20 can be utilized to form a stack 40. Specifically, the present invention encompasses a means for positioning the disks 20 relative to each other to form the stack 40. The centers 22 of each of the disks 20 are aligned substantially linearly with each other so that the stack 40 has a longitudinal axis LA extending through the centers 22 of each of the disks 20. Also, the diameters of the disks 20 are substantially the same. Alternatively, the diameters of the disks 20 can be different.

The periphery 24 of adjacent disks 20 in the stack 40 are separated from each other at different distances. The closest distance separating the peripheries 24 of two adjacent disks 20 is less than the width of the pin bones in the fillet F. Preferably, portions of the respective peripheries 24 of the adjacent disks 20 contact each other, which, obviously, is the closest distance separating the peripheries 24 of two adjacent disks 20 in the stack 40. The contacting portions of the peripheries 24 of the disks 20 are known as "pinch-points" 42. Gaps 44 exist between the radially separated pinch-points 42, in which the respective peripheries 24 of the adjacent disks 20 contact each other at one pinch-point 42, bow away from each other to form a gap 44, and then converge again to form another pinch-point 42. Preferably the separation distance of the peripheries 24 of adjacent disks 20 forming the gaps 44 is, at a minimum, at least twice the width of the pin bones in the fillet F. In one embodiment, the widest portion of the radially extending gap 44 is approximately 0.125 inches.

Still referring to FIG. 2, one of the disks 20 in the stack 40 can be considered to be a first disk 46 and an adjacent disk considered to be a second disk 48. Each of the downwardly positioned sections 32 of the periphery 24 of the first disk 46 is in registry with and contacts one respective upwardly positioned section of the periphery 24 of the second disk 48 to form a pinch-point 42. In conjunction, each of the upwardly positioned sections 30 of the first disk 46 is in registry with and is spaced apart from one respective downwardly positioned section of the second disk 48 to form the widest portion of a radially extending gap 44.

Figures 3, 4:
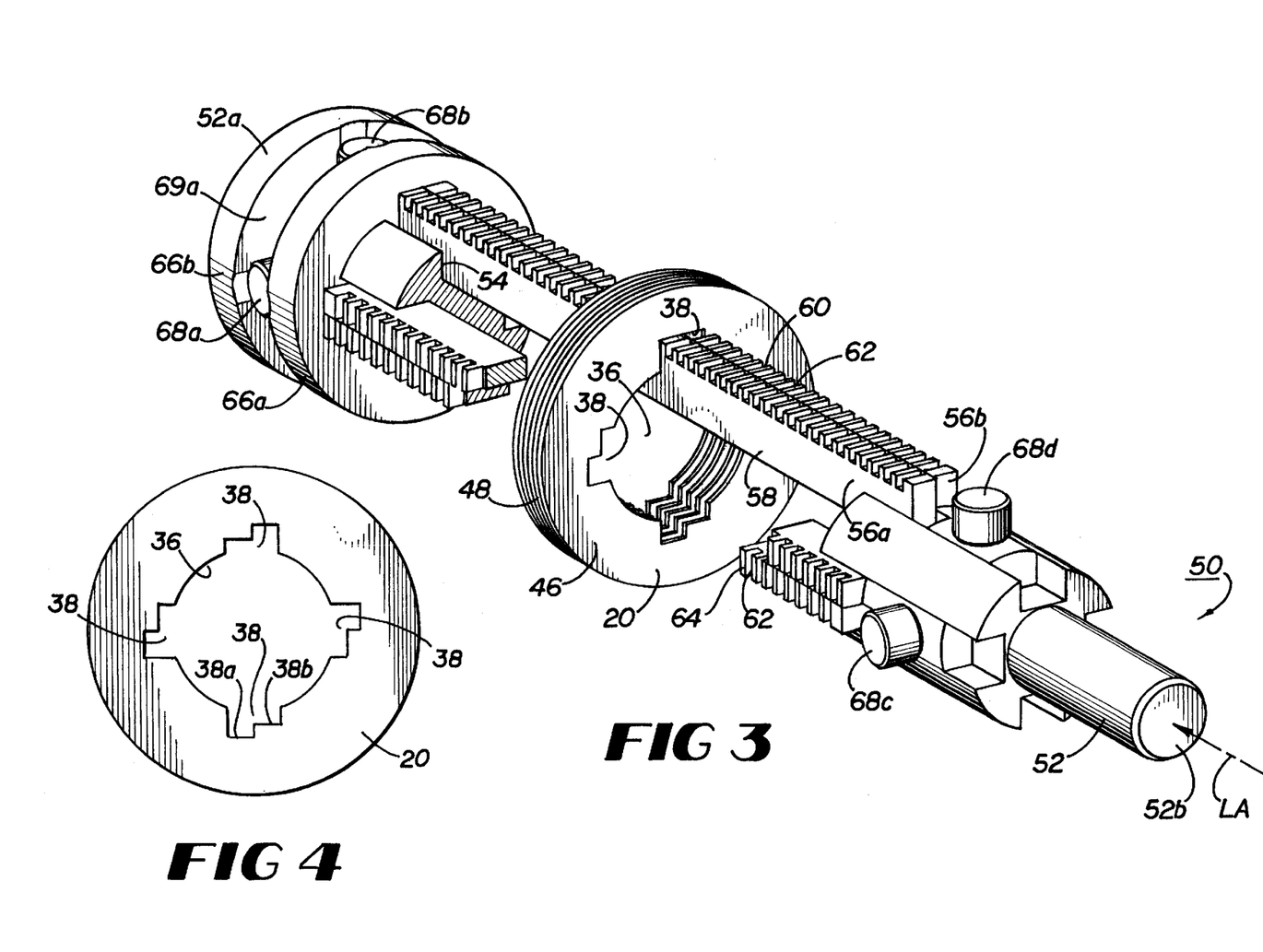
FIG. 3 is a front perspective view of a second embodiment of a stack of the disks, in which disks are substantially planar and the sides of the disks are aligned in a parallel arrangement.
FIG. 4 shows a top view of one disk used in the second embodiment shown in FIG. 3.

Alternatively, as shown in FIG. 3, the disks 20 in the stack 40 each can be substantially planar. For the planar disks, the sides of the disks 20 can be aligned in a parallel arrangement with the sides of adjacent disks along the longitudinal axis LA. In this arrangement, the sides of the two adjacent disks in the stack 40 are substantially parallel to each other, but can be tilted so that the sides of two adjacent disks in the stack 40 may move toward to each other and form a single pinch-point as described below.

Different structures can be used for positioning disks relative to each other to form the stack 40, depending on whether the disks 20 are non-planar or planar. Referring now to FIG. 2, to address the means for positioning the non-planar disks 20 relative to each other to form the stack 40, the center 22 of each disk 20 preferably defines an opening 36 therethrough. The stationary positioning means include a shaft (not shown) having a circumference of a size to be complementarily received by and disposed through the opening 36 in each disk 20 so that the shaft is disposed along the longitudinal axis LA of the stack 40. Optionally, the opening 36 in each of the disks 20 further defines a keyway 38 and the shaft is splined to be complementarily received in the keyway 38 of the opening 36. Thus, the interface of the keyway 38 and the spline prevent relative rotational movement between the shaft and the disks 20 in the stack 40. FIG. 2 shows the disks 20 aligned to be assembled on the splined shaft forming an alternating pattern of pinch-points 42 and gaps 44. Also, the stationary positioning means can include an appropriate spacer (not shown) between each disk 20 in the stack 40 to provide the desired axial tension. This assembly of the disks 20 and spacers on a shaft can be of any suitable length. In one embodiment, each stack 40 can include about 132 disks per linear foot. Other arrangements can be made to accommodate, for instance, the size of the fish to be processed.

The means positioning the planar disks 20 relative to each other to form the stack 40 can have different structures. As shown in FIG. 3, the positioning means 50 has a shaft 52 having a circumference of a size to be complementarily received by and disposed through the opening 36 in each disk 20 so that the shaft is disposed along the longitudinal axis LA of the stack 40. The shaft 52 has a first end 52a and a second end 52b. Additionally, the shaft 52 defines a plurality of recesses 54, each recess sized to receive a pair of arms 56a and 56b. More than one pair of arms can be received by the shaft 52. For the second embodiment shown in FIG. 3, up to four (4) pairs of arms can be utilized. It is not necessary for each recess 54 to receive a pair of arms 56a, 56b; it can just receive a single arm. If more than one arm is utilized, these arms are substantially similar to each other in shape.

The first arm 56a has a body portion 58 and a teeth portion 60. The body portion 58 of the first arm 56a is sized to be complementarily received by and disposed through the recess 54 so that when shaft 52 rotates, the first arm 56a rotates with the shaft 52 as well. The teeth portion 60 is sized to complementarily receive one keyway 38 of the disk 46 therein. As shown in FIG. 4, in this embodiment, keyway 38 has a step structure with a first slot 38a and a second slot 38b. The teeth portion of each arm is sized so that when two arms 56a, 56b are both received in the keyway 38, the first arm 56a is received in slot 38a and the second arm 56b is received in slot 38b.

Referring back to FIG. 3, the teeth portion 60 of each arm 56a, 56b contains a plurality of spread apart teeth 64 defining a groove 62 between each adjacent pair of teeth 64. Each groove 62 is sized to receive one of the disks 20 through the interface of the keyways with the teeth portion 60. When a disk, say disk 46, is received within a groove 62, the opposite sides of the disk 46 each contact two teeth 64 that are adjacent to the groove 62. The teeth 64 thus function as spacers to position disks 20 of the stack 40 at proper axial locations with appropriate relative axial separation from each other. Therefore, the interface of the keyways 38 and the teeth portion 60 prevents relative rotational movement as well as the relative lateral movement between the shaft 52 and the disks 20 in the stack 40. Again, the total number of disks 20 in a stack 40 can be easily adjusted according to the need. For the second embodiment of FIG. 3, each stack 40 includes about 86 disks.

Preferably, the first arm 56a and the second arm 56b work in pairs to hold disks 20 in a stack 40. As shown in FIG. 4, each disk 20 has four keyways 38. Addressing a single keyway 38, disk 46 is received by a groove 62 of the first arm 56a through the slot 38b of the keyway 38. Disk 48, adjacent to the disk 46, has the positions of the slots 38a, 38b reversed from disk 46 in each of the four keyways 38. The sides of disk 48 are received by a groove 62 of the second arm 56b through the slot 38a. Accordingly, for the single keyway 38 in disks 46 and 48, first arm 56a engages disk 46 with its teeth 64 and does not contact disk 48 because the corresponding slot is higher and second arm 56b engages disk 48 with its teeth and does not contact disk 46. This pattern is repeated along the longitudinal axis LA, thereby providing a pattern of notches by which each arm 56a, 56b engages every other disk 20 of the stack 40. Moreover, the engaging mechanism provided by the shaft 52 and the first arm 56a and the second arm 56b can also be used to position the non-planar disks 20 shown in FIGS. 1 and 2 relative to each other to form a stack 40 with minor modifications.

Two stationary first and second cams 66a, 66b are located near the first end 52a of the shaft 52 with first and second cam followers 68a, 68b. Similarly, two similar stationary third and fourth cams 66c, 66d (not shown) and the third and fourth cam followers 68c, 68d are located near the second end 52b of the shaft 52. The first cam 66a and the second cam 66b define a nonlinear surface 69a, and the third cam 66c and the fourth cam 66d also define a similar nonlinear surface (not shown). The first and second cam followers 68a, 68b are connected to the shaft 52 and interface with the nonlinear surface 69a. Thus, the first and second cam followers 68a, 68b move back and forth along the longitudinal axis LA when they are rotated by the shaft 52 and contact the nonlinear surface 69a that is stationarily positioned circumscribing the shaft 52. Similarly, the third and fourth cam followers 68c, 68d interface with the nonlinear surface formed by the third cam 66c and the fourth cam 66d and also moves along the longitudinal axis LA when they are rotated by the shaft 52. Each cam follower also engages one arm; for instance, the cam follower 68b engages with the arm 56a while the cam follower 68d engages the arm 56b. Because the cam followers 68b and 68d are located at the opposite ends of the shaft 52, they move in opposite directions. When the shaft 52 rotates, therefore, the second cam follower 68b causes the arm 56a to move along the longitudinal axis LA and at the same time, the fourth cam follower 68d causes the arm 56b also to move along the longitudinal axis LA, but in an opposite direction of the axial or longitudinal motion of the arm 56a, so that the disks received by the arm 56a tilt to a first direction, for instance, left, and the disks received by the arm 56b tilt to a second direction opposite the first direction, for instance, right. Therefore, two adjacent disks are tilted and bent relative to each other and form a pinch-point at the peripheries of the disks to grip a pin bone. As the shaft 52 continues to rotate, the relative motion of arms 56a, 56b causes the two adjacent disks to tilt in reverse directions and thus the two disks disengage and separate from each other and the pinch-point no longer exists. Multiple arms can be utilized to form more pinch-points during a complete round of the rotation by the shaft 52. For the embodiment shown in FIGS. 3 and 4, four pairs of arms engage the disks 20. Alternatively, arms can be introduced into different keyways separately.

Figure 5:
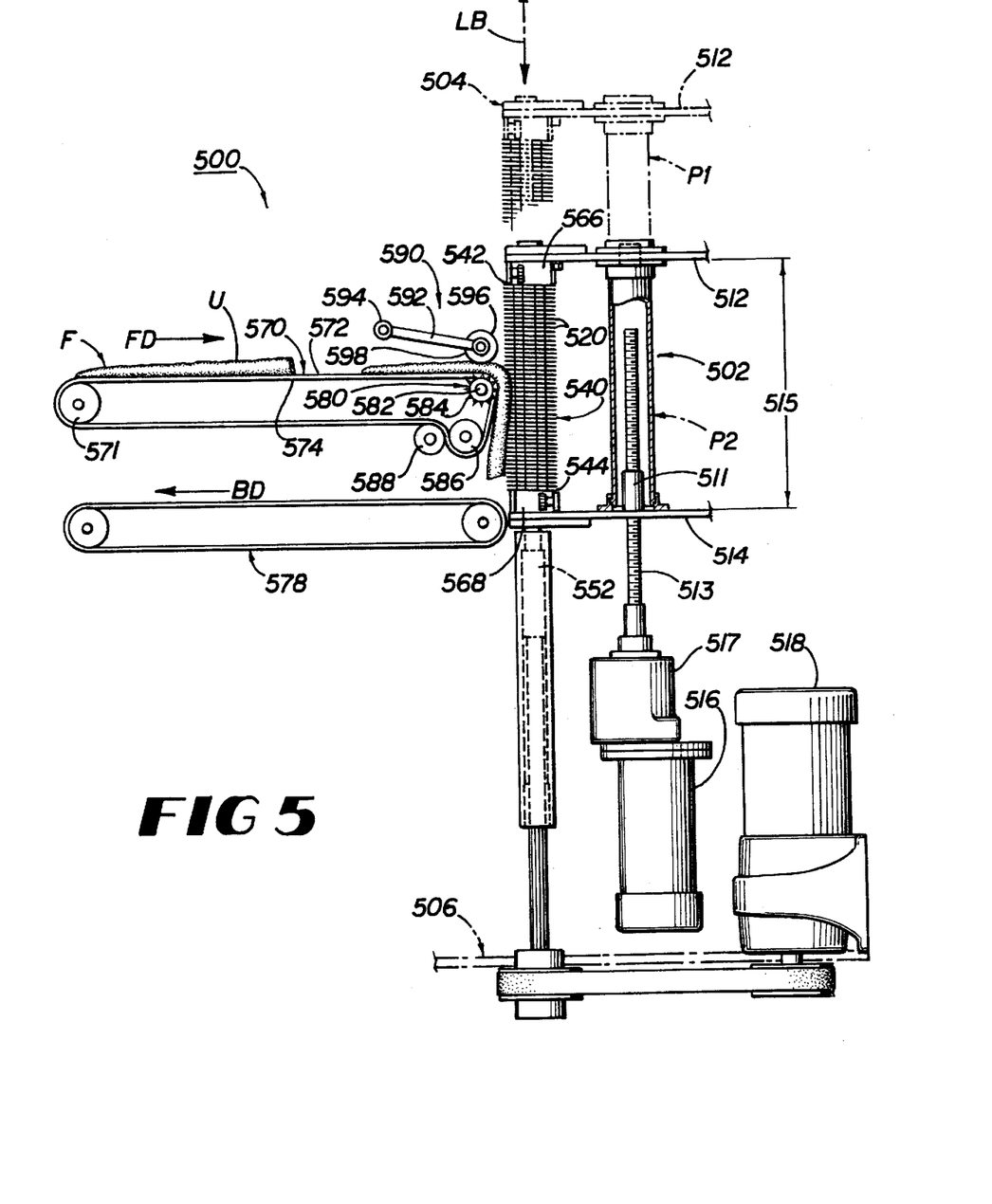
FIG. 5 is a partial side view of a pin bone removing apparatus of the present invention using one of the stacks of the disks shown in FIGS. 2 and 3.

Referring now to FIG. 5, in one embodiment, the present invention is an apparatus 500 that has a frame 502 having a first end 504 and an opposed second end 506 defining an axis LB therebetween. A stack 540 of disks 520 is positioned between the first end 504 and the second end 506. The disks in the stack 540 are positioned relative to each other by a shaft 552 to form the stack 540 having a longitudinal axis LA. The shaft 552 is positioned between the first end 504 and the second end 506 of the frame 502 such that the longitudinal axis LA of the stack 540 is parallel or substantially parallel to the axis of LB of the frame 502. The shaft 552 is rotatable about the axis LB of the frame 502. In the embodiment shown in FIG. 5, the axis LB of the frame 502 and the longitudinal axis LA of the stack 540 are parallel. In the following text, unless otherwise specified, the axis LB of the frame 502 and the longitudinal axis LA of the stack 540 are thus considered as one axis and interchangeable.

As discussed above for FIGS. 1–4, each of the disks 520 of the stack 540 has a center, a periphery circumscribing the center to form an opening, a diameter, a first side, and an opposed second side. The disks 520 of the stack 540 can have the same or different geometric shape or size, be made from the same or different materials, and have openings with a different shape or size. For example, in the embodiment shown in FIG. 5, the disks 520 of the stack 540 are substantially the same. The opening of each disk 520 of the stack 540 can be substantially circular, elliptical, rectangular, square, or another geometric shape. The shaft 552 has a circumference of a size to be complementarily received by and disposed through the opening in each disk thereby to form the stack 540. Thus, the shaft 552 cross-sectionally can be substantially circular, elliptical, rectangular, square, or another geometric shape. For example, in the embodiment shown in FIG. 5, the shaft 552 is cylindrical with a circular cross-section. The embodiments of the stack of the disks 520 and the shaft shown in FIGS. 1–4 can be utilized as the stack 540 and the shaft 552 in FIG. 5 to practice the present invention. For example, shaft 552 can be cam-operated to drive the disks 520 as discussed above and shown in FIGS. 3–4. Alternatively, other types of the disks and complimentary shafts can also be used to practice the present invention.

Still referring to FIG. 5, the apparatus 500 has a first movable arm 512 and a second movable arm 514, which are positioned apart from each other to define a space 515 therebetween to receive the stack 540 of the disks 520. A first clamping device 566 associates or couples one end 542 of the stack 540 with the first movable arm 512, and a second clamping device 568 associates or couples the other end 544 of the stack 540 with the second movable arm 514, respectively. Each clamping device can include and use cam and cam follower means as discussed above and shown in FIG. 3. A motor 516 is coupled to the first movable arm 512 and the second movable arm 514 to drive the arms 512, 514. An additional transmission devices 517 engages the first movable arm 512 and the second movable arm 514 and the motor 516 so that the motor 516 can drive the first movable arm 512 and the second movable arm 514 to move synchronously along the axis LB. The motor 516 is coupled to the transmission device 517 which drives a lead screw 513 that is threaded through a follower 511 fixed to the frame 502. Because the stack 540 of the disks 520 is engaged to the first movable arm 512 and the second movable arm 514, the axial movement of the first movable arm 512 and the second movable arm 514 causes the stack 540 of the disks to move along with them. In this embodiment, the frame 502 is set up to allow the first movable arm 512 and the second movable arm 514, together with the stack 540, to move back and forth vertically. Alternatively, the frame 502 can be set up to allow the first movable arm 512 and the second movable arm 514, together with the stack 540, to move horizontally.

The apparatus 500 further includes means for rotating the stack 540 of the disks 520 about its longitudinal axis LA. The rotating means can be a motor 518 or the like that produces a rotational output to which the shaft 552 of the stack 540 is coupled. The motor 516 and the motor 518 can be different, as shown in FIG. 5. Alternatively, they can be just one single motor to drive the first and second movable arms 512 and 514 and to rotate the shaft 552 with proper transmission gears and/or control device, such as a controller (not shown).

Still referring to FIG. 5, the apparatus 500 has means for positioning a fillet F (or fillets) over the stack 540 of the disks 520. In one embodiment, the position means has a longitudinally extending endless belt 570, where the endless belt 570 has a top surface 572 that moves in the first direction FD. The endless belt 570 is positioned in a spaced-apart relationship to the frame 502 so that the longitudinal axis LA of the stack 540 is oriented substantially perpendicular to the first direction FD.

Additionally, a floating feed roller 590 having a segment 592 and a wheel 596 is mounted to the segment 592. One end 594 of the segment 592 is pivotally connected to a supporting frame (not shown) or other type of support. The wheel 596 is rotatably connected to the other end of the segment 592 and has an outer perimeter 598 adapted to roll over the upper side U of the fillet F as it moves in the first direction FD.

A nose roller 580 is positioned beneath the top surface 572 of the endless belt 570, as shown in FIG. 5. The nose roller 580 and the feed roller 590 are positioned relative to each other to define a space therebetween to allow the fillet F, which is carried by the endless belt 570, to pass therethrough to be positioned so as to be in contact with the stack 540 of the disks 520. The nose roller 580 also can provide support and at least partial driving force to the endless belt 570. A roller 571 can also provide driving force to the endless belt 570.

Figure 6:
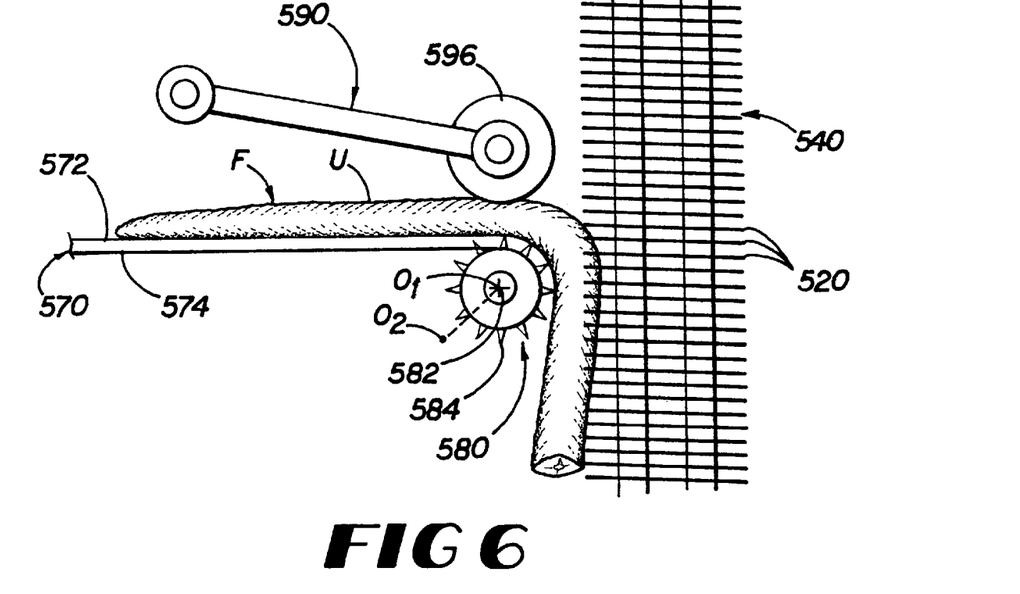
FIG. 6 is a partial side view of the nose roller used in the pin bone removing apparatus shown in FIG. 5 at a first position.
Figure 7:
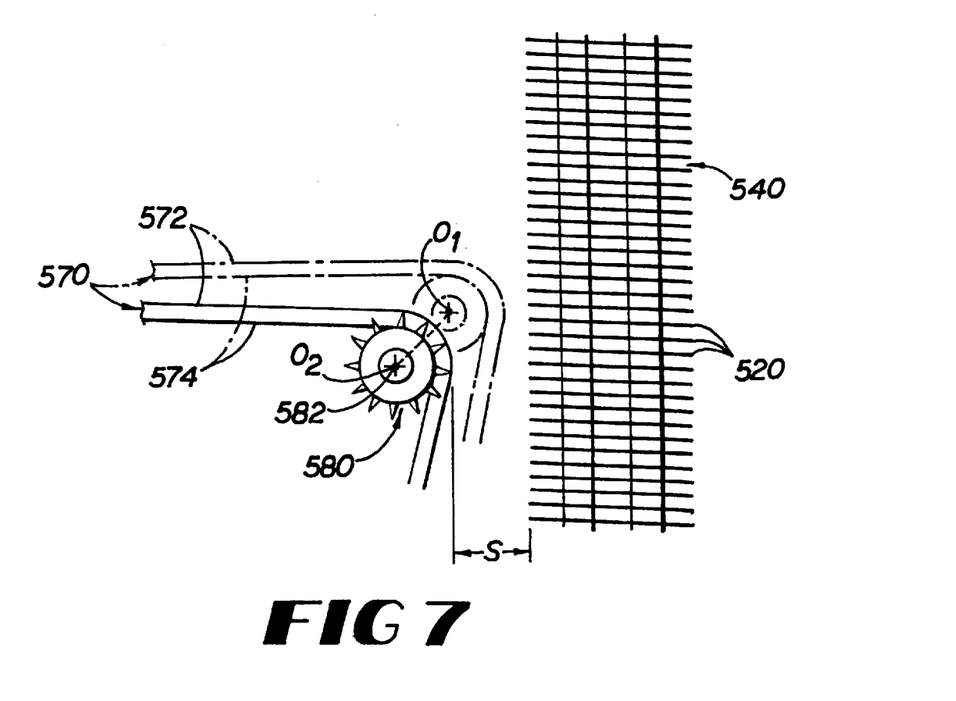
FIG. 7 is a partial side view of the nose roller used in the pin bone removing apparatus shown in FIG. 5 at a second position.

Referring now to FIGS. 5–7, the nose roller 580 has a center 582 and a plurality of spikes 584 at the periphery of the nose roller 580. The nose roller 580 is movable between a first position $O_1$ and a second position $O_2$. At the first position, where the center 582 of the nose roller 580 is substantially located at $O_1$, the spikes 584 of the nose roller 580, which are in direct contact with the lower surface 574 of the endless belt 570, exert pressure to the fillet F through the endless belt 570 and carry the fillet F to come into contact with the stack 540 of the disks 520 without significant slipping. Alternatively, the endless belt 570 can have a plurality of openings therethrough in registry with the spikes 584 to allow the spikes 584 to pass through and engage the fillet F. Because the nose roller 580 rotates continuously during the operation, the fillet F is carried approximately in a 90 degrees of rotation at the edge of the endless belt 570 when the fillet F comes into contact with the stack 540 of the disks 520. Additionally, the wheel 596 of the feed roller 590 cooperates with the nose roller 580 to exert a nominal amount of pressure to the upper side U of the fillet F to secure the fillet F to the spikes 584 as the fillet F moves through the space between the nose roller 580 and the feed roller 590 in the first direction FD.

Although not necessary to function properly, once the whole fillet F passes over the nose roller 580, the nose roller 580 can retract from the first position $O_1$ to the second position $O_2$. At the second position $O_2$, where the center 582 of the nose roller 580 is substantially located at $O_2$, the nose roller 580 and therefore the endless belt 570 are positioned away from the stack 540 of the disks 520 so that a space S is defined between the stack 540 of the disks 520 and the nose roller 580 to allow the stack 540 to move at a fast pace when there is no fillet between the stack 540 of the disks 520 and the nose roller 580. Alternatively, the nose roller 580 can be positioned so that when there is a fillet between the stack 540 of the disks 520 and the nose roller 580, the spikes 584 of the nose roller 580 can exert pressure to the fillet through the endless belt 570, and when there is no fillet between the stack 540 of the disks 520 and the nose roller 580, there is a space between the stack 540 of the disks 520 and the nose roller 580 to allow the stack 540 to move at a fast pace.

For the embodiments shown in FIGS. 5–7, the nose roller 580 has spikes 584 to engage with the endless belt 570 and hence the fillet F. Alternatively, the nose roller 580 can have other configurations, such as a wheel with substantially round periphery.

Additional elements can be utilized to practice the present invention, such as optional rollers 586, 588 shown in FIG. 5, to facilitate the movement of the endless belt 570. Moreover, a second endless belt 578, which is positioned underneath the endless belt 570, can be used to transfer the fillet F out or away from the frame 502 once the fillet F is processed through the stack 540 of the disks 520.

Still referring to FIGS. 5–7, the arm drive motor 516 can be set to cause the first movable arm 512 and the second movable arm 514 to move along the axis LB of the frame 502 at adjustable speeds. In one embodiment, the first movable arm 512 and the second movable arm 514 move at a first speed $V_1$ when the nose roller 580 is at the first position $O_1$ and at a second speed $V_2$ when the nose roller 580 is at the second position $O_2$. The first speed $V_1$ and second speed $V_2$ can be same or different. When the speed $V_2$ is chosen as greater than $V_1$, the first movable arm 512 and the second movable arm 514 cause the stack 540 of the disks 520 to quickly move back to a starting position after a fillet is processed, which improves the operation efficiency and productivity. A computer or controller (not shown) can be utilized to coordinate various components of the apparatus 500 during the operation.

A process of removing a pin bone from a fillet utilizing the apparatus according to the present invention is now described as follows. Referring to FIG. 5, the in-feeding, endless belt 570 carries the fillet F with its skin side in contact with the top surface 572, towards the stack 540 of the disks 520 in the direction FD. When the fillet F is carried into the space between the feed roller 590 and the nose roller 580, the feed roller 590 provides a nominal amount of pressure to the fillet F to secure it to the spikes 584 of the nose roller 580, which is now at the first position $O_1$. The nose roller 580 cooperates with the feed roller 590 and carries the fillet F through approximately 90 degrees of rotation to come in contact with the stack 540 of the disks 520. The stack 540 of the disks 520 rotates about the longitudinal axis LB, which is caused by the rotation of the shaft 552, and travels vertically downwardly from a start or first position $P_1$ at a first speed to a second position $P_2$. The stack 540 will travel back from the second position $P_2$ to the first position $P_1$ at a second speed as discussed in more detail below. The movement from position $P_1$ to $P_2$ is caused by the movements of the first movable arm 512 and the second movable arm 514. The first speed can be chosen to be substantially the same as the speed rate, or a third speed, at which the endless belt 570 carries the fillet F such that the fillet F is steadily fed to the stack 540 of the disks 520. Thus, as the fillet F moves from being horizontally oriented, to substantially vertically oriented, the upper side of the fillet F contacts and engages the stack 540 of disks 520, which moves vertically downwardly synchronously with the fillet F. As the fillet F bends or moves from the horizontal to the vertical orientation, the fillet F is positioned adjacent the stack 540 and a portion of the pin bone is disposed in one gap between the peripheries of two adjacent disks in the stack 540. As the fillet F and the stack 540 of the disks 520 move relative to each other as a result of the rotation of the stack 540, the pin bone becomes wedged in a portion of the gap as the bone and a pinch-point move closer together. Additional relative motion by rotation of the stack 540 causes the wedged pin bone to be plucked from the fillet F as the fillet F and portion of the periphery that detachably hold the pin bone separate from each other. The resulting removal of the pin bone occurs without removing the meat from the fillet F or creating an unattractive appearance.

When the portion of the fillet F that contains pin bones has passed over the nose roller 580, the nose roller 580 retracts from the first position O₁ to the second position. O₂, thereby removing the fillet F from contact with the rotating tilting stack 540 of the disks 520. The fillet F continues to be fed over the nose roller 580 and contacts the out-feed, second endless belt 578, which carries the fillet F, skin side up, out of the apparatus 500. Once the nose roller 580 retracts to the second position O₂, the rotating tilting stack 540 of the disks 520 travels vertically upwardly from the second position P₂ to the starting, first position P₁ at a second speed rate that is greater than the first speed rate. This cycle is repeated when the next fillet is fed into the apparatus 500 and triggers the return of the nose roller 580 to the first position O₁ and the start of the downward movement of the rotating tilting stack 540 of the disks 520. Thus, the rotating stack 540 is oscillating between the first position P₁ and the second position P₂ with variable speeds to process incoming fillets. Each cycle can be started by the contacting of the feed roller 590 by an incoming fillet, by a switch, by a light beam detector or other suitable electronic detection device, or by any combination of them. The retraction of the nose roller 580 from the first position O₁ to the second position O₂ and the rapid return of the rotating stack 540 can be triggered by, for example, a preset limit switch (not shown) that is set to encompass the length of the pin bone line for the size and species of fish fillets being processed. One advantage of the process performed by the apparatus 500 is that the rotating stack 540 operates at different speeds in an operation circle, which offers a more efficient pin-bone removal apparatus and method.

As the fillet F initially contacts the rotating stack 540, the pin bones that were severed when the head was cut off, are removed. The fillet F is then carried around the nose roller 580 by the downward movement of the rotating stack 540. Because the fillet F is bent around the nose roller 580, the pin bone ends are forced to project from the flesh further than when the fillet F is horizontally disposed, and the pin bone ends are then gripped by the rotating disks 520 and removed. The nose roller 580 can be weighted or spring-loaded to provide an amount of pressure on the fillet F against the rotating stack 540, self-adjusting for the varying thickness of the fillet. Scavenging and removal of the pulled pin bones is by water blast (not shown) directed at the side of the rotating stack 540. Many fillets can be consecutively fed through the arrangement of components.

According to another embodiment of the present invention, an apparatus (not shown) can be configured to process fillets simultaneously from each side of the apparatus and will have a duplication of those elements herein described on each side that processes the fillets, with the rotation of the stack of the disks each being in an appropriate direction to accommodate the natural lay of the pin bones in the fillets.

Many other variations can be made within the spirit of the present invention. For example, the process could be performed without using the out-feed endless belt. Moreover, the process can be performed by allowing the stack of the disks to move back and forth at different speeds horizontally, in which case the relative position and orientation between the frame 502 and the endless belt 570, among other things, need to be adjusted accordingly.

Although the present invention has been described with reference to specific details of certain embodiments thereof, it is not intended that such details should be regarded as limitations upon the scope of the invention except as and to the extent that they are included in the accompanying claims.

What is claimed is:

1. A pin bone removal apparatus, comprising:
  a. a frame having a first end and an opposed second end defining an axis therebetween;
  b. a plurality of disks, each disk having a center, a periphery circumscribing the center to form an opening, a diameter, a first side, and an opposed second side;
  c. a shaft positioned between the first end and the second end of the frame and rotatable about the axis of the frame, the shaft having a circumference of a size to be complementarily received by and disposed through the opening in each disk to form a stack of the disks having a longitudinal axis substantially parallel to the axis of the frame;
  d. a first movable arm; and
  e. a second movable arm positioned apart from the first movable arm to define a space therebetween for receiving the stack of the disks therein, wherein the first and second movable arms are movable synchronously along the axis of the frame to cause the stack of the disks to move along with the first and second movable arms.

2. The apparatus of claim 1, further comprising at least one motor for driving the first and second movable arms.

3. The apparatus of claim 1, further comprising:
  a. a first clamping device for associating one end of the stack of the disks with the first movable arm; and
  b. a second clamping device for associating the other end of the stack of the disks with the second movable arm.

4. The apparatus of claim 1, further comprising a motor coupled to the shaft for rotating the shaft to cause the stack of the disks to rotate with the shaft as the shaft rotates.

5. The apparatus of claim 1, wherein the disks are substantially circular in plan view and the first side and the second side of each of disks are non-planar.

6. The apparatus of claim 1, wherein the disks are substantially circular in plan view and the first side and the second side of each of disks are planar.

7. The apparatus of claim 1, wherein the peripheries of adjacent disks in the stack are separated from each other at different distances in which the closest distance separating the peripheries of two adjacent disks is less than a width of a pin bone.

8. The apparatus of claim 7, wherein the closest distance separating the periphery of two adjacent disks in the stack is a portion of the periphery of the adjacent disks contacting each other.

9. The apparatus of claim 7, wherein at least a portion of the periphery of each of the adjacent disks in the stack are spaced apart from each other a distance at least twice the width of the pin bone.

10. The apparatus of claim 1, further comprising:
  a. at least one endless belt for transferring a fillet, wherein the endless belt has a top surface and a lower surface opposite the top surface;
  b. a floating feed roller positioned above the top surface of the endless belt; and
  c. a nose roller positioned beneath the top surface of the endless belt, thereby defining a space between the floating feed roller and the nose roller to allow the fillet to pass therethrough to be positioned over the stack of the disks.

11. The apparatus of claim 10, further comprising a second endless belt to transfer the fillet away from the frame.

12. A pin bone removal apparatus, comprising:
a. a frame having a first end and an opposed second end defining an axis therebetween;
b. a plurality of disks, each disk having a center, a periphery circumscribing the center to form an opening, a diameter, a first side, and an opposed second side;
c. a shaft positioned between the first end and the second end of the frame and rotatable around the axis of the frame, the shaft having a circumference of a size to be complementarily received by and disposed through the opening in each disk to form a stack of the disks having a longitudinal axis substantially parallel to the axis of the frame;
d. at least one endless belt for transferring a fillet, wherein the endless belt has a top surface and an lower surface opposite the top surface;
e. a floating feed roller positioned above the top surface of the endless belt;
f. a nose roller positioned beneath the top surface of the endless belt, thereby defining a space between the floating feed roller and the nose roller to allow the fillet to pass therethrough to be positioned over the stack of the disks;
g. a first movable arm; and
h. a second movable arm apart from the first movable arm thereby to define a space therebetween for receiving the stack of the disks therein, wherein the first and second movable arms are movable synchronously along the axis of the frame and the movements of the first and second movable arms along the axis of the frame cause the stack of the disk to move along with them.

13. The apparatus of claim 12, wherein the nose roller has a plurality of spikes and is movable between a first position and a second position, the nose roller moving to the first position so that the fillet is carried by the spikes of the nose roller to pass the stack of the disks and retracting from the first position to the second position when the fillet passes over the nose roller.

14. The apparatus of claim 12, further comprising a second endless belt to transfer the fillet away from the frame.

15. The apparatus of claim 13, wherein the first and second movable arms move along the axis of the frame at a first speed when the nose roller is at the first position and at a second speed when the nose roller is at the second position.

16. The apparatus of claim 13, further comprising at least one motor for driving the first and second movable arms.

17. The apparatus of claim 12, further comprising a motor coupled to the shaft for rotating the shaft.

18. The apparatus of claim 12, wherein the disks are substantially circular in plan view and the first side and the second side of each of disks are planar.

19. The apparatus of claim 12, wherein the disks are substantially circular in plan view and the first side and the second side of each of disks are non-planar.

20. The apparatus of claim 12, wherein the peripheries of adjacent disks in the stack are separated from each other at different distances in which the closest distance separating the peripheries of two adjacent disks is less than a width of pin bone.

21. The apparatus of claim 20, wherein the closest distance separating the periphery of two adjacent disks in the stack is a portion of the periphery of the adjacent disks contacting each other.

22. The apparatus of claim 20, wherein at least a portion of the periphery of each of the adjacent disks in the stack are spaced apart from each other a distance at least twice the width of the pin bone.

23. An apparatus for removing a pin bone from a fillet, comprising:
a. a stack of a plurality of disks, each disk having a center and a periphery that circumscribes the center to form an opening, the stack of the disks having a longitudinal axis extending through the centers of the disks;
b. means for positioning the fillet over the stack of a plurality of disks at a first position; and
c. means for moving the stack of the disks in a first direction longitudinally at a first speed and the fillet relative to each other so that the pin bone is disposed intermediate the periphery of two adjacent disks in the stack and removed thereby as the pin bone engages a portion of the periphery of each of the two adjacent disks, and moving the stack of the disks at a second speed in a second direction opposite the first direction substantially back toward the first position, wherein the second speed and the first speed are different.

24. The apparatus of claim 23, wherein the positioning means comprises:
a. at least one endless belt, wherein the endless belt has a top surface and an lower surface opposite the top surface;
b. a floating feed roller positioned above the top surface of the endless belt; and
c. a nose roller positioned underneath the top surface of the endless belt, thereby defining a space between the floating feed roller and the nose roller to allow the fillet to pass therethrough to be positioned over the stack of the disks.

25. The apparatus of claim 24, wherein the positioning means further comprises a second endless belt to transfer the fillet away from the frame.

26. The apparatus of claim 23, wherein the moving and returning means comprises:
a. a first movable arm; and
b. a second movable arm positioned apart from the first movable arm thereby to define a space therebetween for receiving the stack of the disks therein, wherein the first and second movable arms move synchronously along the longitudinal axis, and the movements of the first and second movable arms along the longitudinal axis cause the stack of the disks to move along with the first and second movable arms.

27. The apparatus of claim 26, wherein the moving and returning means further comprises at least one motor for driving the first and second movable arms.

28. The apparatus of claim 26, wherein the moving and returning means further comprises:
a. a first clamping device for associating one end of the stack of the disks with the first movable arm; and
b. a second clamping device for associating the other end of the stack of the disks with the second movable arm.

29. The apparatus of claim 23, wherein the center of each disk defines an opening therethrough, and further comprising rotating means for rotating the stack of the disks, the rotating means comprises a shaft rotatable around the longitudinal axis of the stack and having a first end, a second end, at least one recess and a circumference of a size to be complementarily received by and disposed through the opening in each disk so that the shaft is disposed along the longitudinal axis of the stack, whereby the stack of the disks rotates with the shaft as the shaft rotates.

30. The apparatus of claim 29, wherein the rotating means further comprises a motor coupled to the shaft for rotating the shaft.

31. A method of removing a pin bone from a fillet, comprising:
   a. positioning the fillet over a stack of a plurality of disks at a first position, each disk having a center and a periphery that circumscribes the center, the stack of the disks having a longitudinal axis extending through the centers of the disks;
   b. moving the stack of the disks in a first direction longitudinally at a first speed and the fillet relative to each other so that the pin bone is disposed intermediate the periphery of two adjacent disks in the stack and removed thereby as the pin bone engages a portion of the periphery of each of the two adjacent disks; and
   c. returning the stack of the disks to the first position.

32. The method of claim 31, wherein the returning step comprises returning the stack of the disks at a second speed different from the first speed.

33. The method of claim 32, wherein the rate of the second speed is greater than the rate of the first speed.

34. The method of claim 33, wherein the moving step comprises:
   a. transferring the fillet in the first direction at a third speed so that the fillet passes over the stack of the disks; and
   b. rotating the stack of the disks about the longitudinal axis of the stack.

35. The method of claim 34, wherein the rate of the third speed is substantially same as the rate of the first speed.

36. The method of claim 31, further comprising the step of repeating steps (a)–(c) for removing a pin bone from a next fillet.

37. A pin bone removal apparatus, comprising:
   a. a frame having a first end and an opposed second end defining an axis therebetween;
   b. a plurality of disks, each disk having a center, a periphery circumscribing the center to form an opening, a diameter, a first side, and an opposed second side;
   c. a shaft positioned between the first end and the second end of the frame and rotatable about the axis of the frame, the shaft having a circumference of a size to be complementarily received by and disposed through the opening in each disk to form a stack of the disks having a longitudinal axis substantially parallel to the axis of the frame;
   d. a first movable arm;
   e. a second movable arm positioned apart from the first movable arm thereby to define a space therebetween for receiving the stack of the disks therein;
   f. a first motor for moving the first and second movable arms; and
   g. a second motor for rotating the stack of the disks above the axis of the frame, wherein the first and second movable arms move synchronously along the axis of the frame to cause the stack of the disks to move along with the first and second movable arms.

38. The apparatus of claim 37, wherein the first and second motors are different.

39. The apparatus of claim 37, wherein the first and second motors are the same.

* * * * *

UNITED STATES PATENT AND TRADEMARK OFFICE
CERTIFICATE OF CORRECTION

PATENT NO. : 6,406,366 B1
DATED : June 18, 2002
INVENTOR(S) : Lawrence V. Kozycki It is certified that error appears in the above-identified patent and that said Letters Patent is hereby corrected as shown below:

Column 13,
Line 17, please delete "an" and substitute therefor: -- a --.
Line 30, please delete "are movable" and substitute therefor: -- move --.
Line 33, please delete "disk" and substitute therefor: -- disks --.

Column 14,
Line 25, please delete "an" and substitute therefor: -- a --.

Column 15,
Line 32, please delete "substantially same" and substitute therefor:
-- substantially the same --.

Signed and Sealed this

Fifth Day of November, 2002

*Attest:*

JAMES E. ROGAN
*Director of the United States Patent and Trademark Office*

*Attesting Officer*